US011533301B2

(12) United States Patent
Jahid et al.

(10) Patent No.: US 11,533,301 B2
(45) Date of Patent: *Dec. 20, 2022

(54) SECURE KEY MANAGEMENT PROTOCOL FOR DISTRIBUTED NETWORK ENCRYPTION

(71) Applicant: Nicira, Inc., Palo Alto, CA (US)

(72) Inventors: Sonia Jahid, Campbell, CA (US); Ganesan Chandrashekhar, Campbell, CA (US); Bin Qian, Palo Alto, CA (US); Azeem Feroz, San Jose, CA (US)

(73) Assignee: NICIRA, INC., Palo Alto, CA (US)

( * ) Notice: Subject to any disclaimer, the term of this patent is extended or adjusted under 35 U.S.C. 154(b) by 38 days.

This patent is subject to a terminal disclaimer.

(21) Appl. No.: 17/063,441

(22) Filed: Oct. 5, 2020

(65) Prior Publication Data

US 2021/0036997 A1    Feb. 4, 2021

Related U.S. Application Data

(63) Continuation of application No. 15/421,377, filed on Jan. 31, 2017, now Pat. No. 10,798,073.
(Continued)

(51) Int. Cl.
*H04L 29/06*    (2006.01)
*H04L 9/40*    (2022.01)

(52) U.S. Cl.
CPC ........ *H04L 63/061* (2013.01); *H04L 63/0807* (2013.01)

(58) Field of Classification Search
CPC ................ H04L 63/061; H04L 63/0807
See application file for complete search history.

(56) References Cited

U.S. PATENT DOCUMENTS 6,061,349 A ‡ 5/2000 Coile ................... H01R 31/005
370/38
6,101,543 A ‡ 8/2000 Alden ............... H04L 29/12028
709/22
(Continued)

FOREIGN PATENT DOCUMENTS

CN    1783139 A    6/2006
CN    102122327 A    7/2011
(Continued)

OTHER PUBLICATIONS

Varalakshmi, P., et al., "Integrity Checking for Cloud Environment Using Encryption Algorithm," 2012 International Conference on Recent Trends in Information Technology, Apr. 19-21, 2012, 5 pages, IEEE, Chennai, Tamil Nadu, India.‡
(Continued)

*Primary Examiner* — Yonas A Bayou
(74) *Attorney, Agent, or Firm* — Adeli LLP

(57) ABSTRACT

For an encryption management module of a host that executes one or more data compute nodes (DCNs), some embodiments of the invention provide a method of providing key management and encryption services. The method initially receives an encryption key ticket at an encryption management module to be used to retrieve an encryption key identified by the ticket from a key manager. When the encryption key has been retrieved, the method uses the encryption key to encrypt a message sent by a data compute node executing on the host requiring encryption according to an encryption rule. The encryption key ticket, in some embodiments, is generated for an encryption management module to implement the principle of least privilege. The ticket acts as a security token in retrieving encryption keys from a key manager. Ticket distribution and encryption rule
(Continued)

distribution are independent of each other in some embodiments.

20 Claims, 8 Drawing Sheets

Related U.S. Application Data

(60) Provisional application No. 62/380,338, filed on Aug. 26, 2016.

(56) References Cited

U.S. PATENT DOCUMENTS

| | | | | |
|---|---|---|---|---|
| 6,415,313 B1 ‡ | 7/2002 | Yamada | H04L 45/54 | 370/33 |
| 6,751,729 B1 ‡ | 6/2004 | Giniger | H04L 63/0272 | 713/15 |
| 7,237,008 B1 ‡ | 6/2007 | Tarbotton | G06Q 10/107 | 709/20 |
| 7,254,835 B2 ‡ | 8/2007 | St. Pierre | H04L 29/06 | 370/40 |
| 7,607,168 B1 ‡ | 10/2009 | Tripathi | H04L 63/0428 | 726/13 |
| 7,634,650 B1 ‡ | 12/2009 | Shah | H04L 67/1097 | 713/15 |
| 7,778,194 B1 ‡ | 8/2010 | Yung | H04L 47/10 | 370/25 |
| 7,818,452 B2 ‡ | 10/2010 | Matthews | H04L 45/586 | 709/23 |
| 7,948,986 B1 ‡ | 5/2011 | Ghosh | H04L 45/50 | 370/39 |
| 7,987,497 B1 ‡ | 7/2011 | Giles | G06F 21/53 | 726/2 |
| 8,036,221 B2 ‡ | 10/2011 | Fluhrer | H04L 63/0272 | 370/39 |
| 8,190,767 B1 ‡ | 5/2012 | Maufer | G06F 16/2255 | 709/23 |
| 8,295,492 B2 ‡ | 10/2012 | Suarez | H04L 9/083 | 380/28 |
| 8,307,359 B1 ‡ | 11/2012 | Brown | H04L 69/321 | 718/1 |
| 8,321,925 B1 ‡ | 11/2012 | Durgin | G06F 21/6209 | 726/9 |
| 8,321,936 B1 ‡ | 11/2012 | Green | H04L 63/1416 | 726/23 |
| 8,340,300 B2 ‡ | 12/2012 | Lin | H04L 9/32 | 380/27 |
| 8,364,983 B2 ‡ | 1/2013 | Rangegowda | H04L 9/0833 | 713/19 |
| 8,379,857 B1 ‡ | 2/2013 | Zheng | H04L 9/0833 | 380/25 |
| 8,412,945 B2 ‡ | 4/2013 | Sweet | H04L 63/0807 | 713/17 |
| 8,498,417 B1 ‡ | 7/2013 | Harwood | H04L 67/1097 | 380/27 |
| 8,555,053 B1 ‡ | 10/2013 | Vitalo | G06F 13/382 | 713/15 |
| 8,584,216 B1 ‡ | 11/2013 | Allen | H04L 9/0836 | 726/6 |
| 8,601,583 B1 ‡ | 12/2013 | Chandrasekhar | G06F 21/562 | 726/24 |
| 8,751,828 B1 ‡ | 6/2014 | Raizen | H04L 9/08 | 713/19 |
| 9,027,135 B1 ‡ | 5/2015 | Aziz | H04L 63/1441 | 726/23 |
| 9,154,327 B1 ‡ | 10/2015 | Marino | H04L 41/0813 | |
| 9,171,178 B1 ‡ | 10/2015 | Banerjee | H04L 67/1097 | |
| 9,178,698 B1 ‡ | 11/2015 | Jarjur | H04L 9/0861 | |
| 9,246,876 B1 ‡ | 1/2016 | Melam | H04L 12/4641 | |
| 9,264,313 B1 ‡ | 2/2016 | Manuguri | H04L 41/5058 | |
| 9,317,316 B2 ‡ | 4/2016 | Liu | G06F 21/575 | |
| 9,430,295 B1 ‡ | 8/2016 | Eizadi | H04L 63/00 | |
| 9,489,519 B2 ‡ | 11/2016 | Feroz | G06F 9/45558 | |
| 9,613,218 B2 ‡ | 4/2017 | Thota | G06F 9/45558 | |
| 9,792,447 B2 ‡ | 10/2017 | Thota | G09C 1/00 | |
| 9,924,354 B2 | 3/2018 | Zhang et al. | | |
| 9,930,066 B2 ‡ | 3/2018 | Chopra | H04L 63/065 | |
| 10,445,509 B2 | 10/2019 | Thota et al. | | |
| 10,747,888 B2 | 8/2020 | Thota et al. | | |
| 10,771,505 B2 | 9/2020 | Chopra et al. | | |
| 10,798,073 B2 | 10/2020 | Jahid et al. | | |
| 11,087,006 B2 | 8/2021 | Feroz et al. | | |
| 2002/0114453 A1 ‡ | 8/2002 | Bartholet | H04L 9/0662 | 380/44 |
| 2003/0065941 A1 ‡ | 4/2003 | Ballard | H04L 63/04 | 726/1 |
| 2003/0079000 A1 ‡ | 4/2003 | Chamberlain | H04L 29/12207 | 709/22 |
| 2003/0093481 A1 ‡ | 5/2003 | Mitchell | H04L 67/02 | 709/20 |
| 2003/0149781 A1 ‡ | 8/2003 | Yared | H04L 63/0815 | 709/22 |
| 2004/0044891 A1 ‡ | 3/2004 | Hanzlik | H04L 63/0435 | 713/15 |
| 2004/0105549 A1 ‡ | 6/2004 | Suzuki | H04L 9/083 | 380/27 |
| 2004/0143734 A1 ‡ | 7/2004 | Buer | H04L 63/0485 | 713/15 |
| 2005/0102525 A1 ‡ | 5/2005 | Akimoto | H04L 63/0428 | 713/18 |
| 2005/0198370 A1 ‡ | 9/2005 | Miller | H04L 63/0428 | 709/23 |
| 2006/0193473 A1 ‡ | 8/2006 | Fu | H04L 9/0822 | 380/27 |
| 2007/0061492 A1 ‡ | 3/2007 | van Riel | G06F 9/5077 | 710/3 |
| 2007/0079307 A1 ‡ | 4/2007 | Dhawan | H04L 29/12584 | 718/1 |
| 2007/0098010 A1 ‡ | 5/2007 | Dube | H04L 69/32 | 370/46 |
| 2007/0098178 A1 | 5/2007 | Raikar | | |
| 2007/0157309 A1 ‡ | 7/2007 | Bin | H04L 63/0428 | 726/15 |
| 2007/0169190 A1 ‡ | 7/2007 | Kolton | G06F 21/552 | 726/22 |
| 2007/0198837 A1 ‡ | 8/2007 | Koodli | H04L 63/0272 | 713/17 |
| 2008/0002724 A1 ‡ | 1/2008 | Grewal | H04L 63/0428 | 370/40 |
| 2008/0005782 A1 ‡ | 1/2008 | Aziz | H04L 63/1425 | 726/3 |
| 2008/0072305 A1 ‡ | 3/2008 | Casado | H04L 67/18 | 726/11 |
| 2008/0082834 A1 ‡ | 4/2008 | Mattsson | G06F 12/1408 | 713/18 |
| 2008/0104692 A1 ‡ | 5/2008 | McAlister | H04L 63/20 | 726/15 |
| 2008/0155252 A1 ‡ | 6/2008 | Nambiar | H04L 9/0838 | 713/15 |
| 2008/0170689 A1 * | 7/2008 | Boubion | H04W 12/041 | 380/260 |
| 2008/0183882 A1 ‡ | 7/2008 | Flynn | H04L 67/02 | 709/22 |
| 2008/0215880 A1 ‡ | 9/2008 | Guichard | H04L 63/065 | 713/16 |
| 2008/0244569 A1 ‡ | 10/2008 | Challener | G06F 9/45558 | 718/1 |
| 2008/0260159 A1 ‡ | 10/2008 | Osaki | H04L 9/0891 | 380/27 |
| 2009/0089351 A1 ‡ | 4/2009 | Belgaied | H04L 49/9063 | 709/20 |
| 2009/0129271 A1 ‡ | 5/2009 | Ramankutty | H04L 12/66 | 370/23 |
| 2009/0235325 A1 ‡ | 9/2009 | Dimitrakos | H04L 45/02 | 726/1 |
| 2009/0238080 A1 ‡ | 9/2009 | Hirano | H04L 45/18 | 370/24 |

(56) References Cited

U.S. PATENT DOCUMENTS

| | | | | |
|---|---|---|---|---|
| 2009/0268903 A1‡ | 10/2009 | Bojinov | G06F 11/1453 | 380/45 |
| 2009/0282266 A1* | 11/2009 | Fries | G06F 21/602 | 713/193 |
| 2009/0319772 A1‡ | 12/2009 | Singh | G06F 21/6218 | 713/15 |
| 2010/0031318 A1‡ | 2/2010 | Gardcia | H04L 63/104 | 726/3 |
| 2010/0031353 A1‡ | 2/2010 | Thomas | G06F 11/3604 | 726/22 |
| 2010/0058051 A1‡ | 3/2010 | Imai | H04L 63/0272 | 713/15 |
| 2010/0107162 A1‡ | 4/2010 | Edwards | H04L 45/58 | 718/1 |
| 2010/0138656 A1‡ | 6/2010 | Chinen | G06F 21/577 | 713/16 |
| 2010/0153701 A1‡ | 6/2010 | Shenoy | H04L 12/4633 | 713/15 |
| 2010/0303241 A1* | 12/2010 | Breyel | G06F 21/602 | 380/29 |
| 2011/0035494 A1‡ | 2/2011 | Pandey | G06F 9/5077 | 709/22 |
| 2011/0085563 A1‡ | 4/2011 | Kotha | H04L 49/70 | 370/40 |
| 2011/0093689 A1‡ | 4/2011 | Pant | G06F 21/606 | 713/2 |
| 2011/0161676 A1 | 6/2011 | Datta et al. | | |
| 2011/0179412 A1 | 7/2011 | Nakae et al. | | |
| 2011/0208960 A1‡ | 8/2011 | Flood | G06F 21/6209 | 713/15 |
| 2011/0295708 A1‡ | 12/2011 | Shin | H04L 9/0891 | 705/26 |
| 2011/0302415 A1‡ | 12/2011 | Ahmad | H04L 9/0825 | 713/16 |
| 2012/0045059 A1‡ | 2/2012 | Fujinami | H04M 1/67 | 380/27 |
| 2012/0084838 A1‡ | 4/2012 | Inforzato | G06F 21/575 | 726/4 |
| 2012/0110055 A1‡ | 5/2012 | Van Biljon | G06Q 30/04 | 709/20 |
| 2012/0110328 A1* | 5/2012 | Pate | H04L 63/0876 | 713/165 |
| 2012/0127991 A1‡ | 5/2012 | Le Rouzic | H04L 65/1006 | 370/35 |
| 2012/0155643 A1* | 6/2012 | Hassan | H04L 63/065 | 380/270 |
| 2012/0260102 A1‡ | 10/2012 | Zaks | G06F 21/72 | 713/18 |
| 2012/0284712 A1‡ | 11/2012 | Nimmagadda | G06F 9/5077 | 718/1 |
| 2012/0304244 A1‡ | 11/2012 | Xie | G06F 21/53 | 726/1 |
| 2012/0321087 A1* | 12/2012 | Fleischman | H04L 9/3213 | 380/279 |
| 2012/0331284 A1‡ | 12/2012 | Kouladjie | H04L 9/088 | 713/15 |
| 2012/0331545 A1‡ | 12/2012 | Baliga | H04W 12/0806 | 726/15 |
| 2013/0019306 A1‡ | 1/2013 | Lagar-Cavilla | G06F 21/566 | 726/22 |
| 2013/0033993 A1‡ | 2/2013 | Cardona | H04L 12/4633 | 370/24 |
| 2013/0034094 A1‡ | 2/2013 | Cardona | H04L 49/70 | 370/36 |
| 2013/0034109 A1‡ | 2/2013 | Cardona | H04L 12/4633 | 370/41 |
| 2013/0036470 A1‡ | 2/2013 | Zhu | H04L 63/0227 | 726/23 |
| 2013/0051399 A1‡ | 2/2013 | Zhang | H04L 47/125 | 370/40 |
| 2013/0067213 A1 | 3/2013 | Liu | | |
| 2013/0073743 A1‡ | 3/2013 | Ramasamy | H04L 67/142 | 709/23 |
| 2013/0085880 A1‡ | 4/2013 | Roth | G06F 9/44505 | 705/26 |
| 2013/0091540 A1‡ | 4/2013 | Chen | H04W 4/21 | 726/1 |
| 2013/0117849 A1‡ | 5/2013 | Golshan | G06F 21/566 | 726/23 |
| 2013/0132722 A1‡ | 5/2013 | Bennett | H04L 9/0816 | 713/17 |
| 2013/0163594 A1‡ | 6/2013 | Sharma | H04L 12/4633 | 370/39 |
| 2013/0212279 A1‡ | 8/2013 | Dutta | G06F 9/5061 | 709/22 |
| 2013/0212395 A1‡ | 8/2013 | D'Souza | H04L 9/0825 | 713/17 |
| 2013/0227303 A1‡ | 8/2013 | Kadatch | G06F 21/6218 | 713/19 |
| 2013/0227550 A1‡ | 8/2013 | Weinstein | G06F 9/45558 | 718/1 |
| 2013/0227558 A1‡ | 8/2013 | Du | H04L 67/18 | 718/1 |
| 2013/0232202 A1‡ | 9/2013 | Fan | H04L 29/06 | 709/20 |
| 2013/0318345 A1‡ | 11/2013 | Hengeveld | H04L 12/4633 | 713/16 |
| 2013/0322453 A1‡ | 12/2013 | Allan | H04L 12/4662 | 370/39 |
| 2013/0332983 A1‡ | 12/2013 | Koorevaar | G06F 9/45558 | 726/1 |
| 2014/0019750 A1‡ | 1/2014 | Dodgson | H04L 63/0281 | 713/15 |
| 2014/0019959 A1‡ | 1/2014 | Dodgson | G06F 8/35 | 718/1 |
| 2014/0050091 A1‡ | 2/2014 | Biswas | H04L 69/04 | 370/23 |
| 2014/0052877 A1‡ | 2/2014 | Mao | H04L 12/4641 | 709/24 |
| 2014/0053245 A1‡ | 2/2014 | Tosa | G06F 21/60 | 726/4 |
| 2014/0059544 A1‡ | 2/2014 | Koganty | G06F 9/45558 | 718/1 |
| 2014/0068602 A1‡ | 3/2014 | Gember | H04L 12/4633 | 718/1 |
| 2014/0075518 A1‡ | 3/2014 | D'Souza | H04L 9/14 | 726/4 |
| 2014/0089658 A1‡ | 3/2014 | Raghuram | G06F 9/45533 | 713/15 |
| 2014/0095868 A1‡ | 4/2014 | Korthny | G06F 21/6218 | 713/16 |
| 2014/0115578 A1‡ | 4/2014 | Cooper | H04L 63/1416 | 718/1 |
| 2014/0122675 A1‡ | 5/2014 | Cohen | H04L 12/4633 | 709/22 |
| 2014/0123230 A1 | 5/2014 | Farina et al. | | |
| 2014/0181975 A1‡ | 6/2014 | Spernow | G06F 21/562 | 726/23 |
| 2014/0189235 A1‡ | 7/2014 | Obligacion | G06F 3/0689 | 711/11 |
| 2014/0226820 A1* | 8/2014 | Chopra | H04L 63/0457 | 380/277 |
| 2014/0237539 A1‡ | 8/2014 | Wing | H04L 69/22 | 726/1 |
| 2014/0280836 A1‡ | 9/2014 | Kumar | H04L 49/15 | 709/22 |
| 2014/0282518 A1‡ | 9/2014 | Banerjee | G06F 9/45533 | 718/1 |
| 2014/0310415 A1‡ | 10/2014 | Kirner | H04L 63/10 | 709/22 |
| 2014/0317737 A1‡ | 10/2014 | Shin | H04L 63/1408 | 726/23 |
| 2015/0003453 A1 | 1/2015 | Sengupta et al. | | |
| 2015/0071298 A1‡ | 3/2015 | Combs | H04L 49/70 | 370/40 |
| 2015/0078550 A1‡ | 3/2015 | Ferguson | H04L 9/088 | 380/44 |

(56) References Cited

U.S. PATENT DOCUMENTS

| | | | |
|---|---|---|---|
| 2015/0086020 A1 | 3/2015 | Harjula et al. | |
| 2015/0150073 A1 ‡ | 5/2015 | Bhalerao | H04L 63/105 726/1 |
| 2015/0220745 A1 ‡ | 8/2015 | Nellitheertha | G06F 21/602 713/19 |
| 2015/0222604 A1* | 8/2015 | Ylonen | H04L 9/3263 713/171 |
| 2015/0222621 A1 | 8/2015 | Baum et al. | |
| 2015/0242594 A1 ‡ | 8/2015 | Harjula | G06F 3/04817 726/2 |
| 2015/0035823 A1 ‡ | 12/2015 | Zhang | H04L 49/70 370/39 |
| 2015/0358231 A1 | 12/2015 | Zhang et al. | |
| 2015/0372980 A1 ‡ | 12/2015 | Eyada | H04L 63/1416 726/1 |
| 2015/0379277 A1 ‡ | 12/2015 | Thota | G06F 9/542 713/18 |
| 2015/0379278 A1 ‡ | 12/2015 | Thota | G06F 21/56 713/18 |
| 2015/0379279 A1 ‡ | 12/2015 | Feroz | G06F 9/45558 713/18 |
| 2015/0379280 A1 ‡ | 12/2015 | Thota | G06F 21/568 713/18 |
| 2015/0379281 A1 ‡ | 12/2015 | Feroz | H04L 63/1408 713/18 |
| 2015/0379282 A1 ‡ | 12/2015 | Thota | G06F 21/568 713/18 |
| 2015/0381362 A1 ‡ | 12/2015 | Thota | G06F 21/6236 713/18 |
| 2015/0381578 A1 ‡ | 12/2015 | Thota | H04L 63/1408 713/16 |
| 2016/0099968 A1* | 4/2016 | Chopra | H04L 63/0272 713/151 |
| 2016/0132347 A1 ‡ | 5/2016 | Brandwine | G06F 9/5088 718/1 |
| 2016/0337346 A1 | 11/2016 | Momchilov et al. | |
| 2017/0005882 A1 ‡ | 1/2017 | Tao | H04L 41/50 |
| 2017/0006018 A1* | 1/2017 | Campagna | H04L 9/088 |
| 2017/0244693 A1* | 8/2017 | Papadopoulos | H04L 9/0861 |
| 2017/0302696 A1 | 10/2017 | Schutz et al. | |
| 2018/0063103 A1 | 3/2018 | Jahid et al. | |
| 2020/0366715 A1 | 11/2020 | Chopra et al. | |

FOREIGN PATENT DOCUMENTS

| | | | | |
|---|---|---|---|---|
| CN | 102238002 A | | 11/2011 | |
| CN | 102546601 A | ‡ | 7/2012 | |
| CN | 102546601 A | | 7/2012 | |
| CN | 103051510 A | ‡ | 4/2013 | |
| CN | 103051510 A | | 4/2013 | |
| EP | 0887981 A2 | | 12/1998 | |
| EP | 0887981 A3 | ‡ | 12/1998 | H04L 29/06 |
| JP | 2006185341 A | | 7/2006 | |
| WO | 2008095010 A1 | | 8/2008 | |
| WO | WO-2008/095010 A1 | ‡ | 8/2008 | H04L 63/102 |
| WO | 2016003491 A1 | | 1/2016 | |
| WO | WO-2016/00349 | ‡ | 1/2016 | G06F 21/56 |

OTHER PUBLICATIONS

Lin, Li, et al., "Data Offload Strategy for Multiple Connections in Wireless Sensor Networks," Journal of Huazhong University of Science and Technology (Natural Science Edition), Dec. 2005, 4 pages, vol. 33.‡
Sekar, Vyas, et al., "Design and Implementation of a Consolidated Middlebox Architecture," 9th USENIX conference on Networked System Design and Implementation, Apr. 25-27, 2012, 14 pages.‡
Popa, Lucian, et al., "Building Extensible Networks with Rule-Based Forwarding," In USENIX OSDI, Month Unknown, 2010, pp. 1-14.‡
Non-Published Commonly Owned International Patent Application PCT/US15/38385, filed Jun. 29, 2015, 100 pages, Nicira, Inc.‡
PCT International Search Report and Written Opinion dated Nov. 13, 2015 for published commonly owned International Patent Application PCT/US14/72886, 12 pages, Nicira, Inc.‡
Guichard, J., et al., "Network Service Chaining Problem Statement," Network Working Group, Jun. 13, 2013, 14 pages, Cisco Systems, Inc.‡
Sherry, Justine, et al., "Making Middleboxes Someone Else's Problem: Network Processing as a Cloud Service," SSIGCOMM, Aug. 13-17, 2012, 12 pages, ACM, Helsinki, Finland.‡
Kent, S., "IP Encapsulating Security Payload (ESP)," Dec. 2005, pp. 1-44, The Internet Society.‡
Joseph, Dilip Antony, et al., "A Policy-aware Switching Layer for Date Centers," Jun. 24, 2008, 26 pages, Electrical Engineering and Computer Sciences, University of California, Berkeley, CA, USA.‡
Casado, Martin, et al., "SANE: A Protection Architecture for Enterprise Networks," Proceedings of the 15th USENIX Security Symposium, Jul. 31, 2006, pp. 137-151.‡
Author Unknown, "Enabling Service Chaining on Cisco Nexus 1000V Series," Month Unknown, 2012, 25 pages, CISCO.‡
Casado, Martin, et al., "SANE: A Protection Architecture for Enterprise Networks," Proceedings of the 15th USENIX Security Symposium, Jul. 31-Aug. 4, 2006, 15 pages, USENIX, Vancouver, Canada.
Joseph, Dilip Anthony, et al., "A Policy-aware Switching Layer for Data Centers," Jun. 24, 2008, 26 pages, Electrical Engineering and Computer Sciences, University of California, Berkeley, CA, USA.
Kent, Stephen, "IP Encapsulating Security Payload (ESP)," RFC 4303, Dec. 2005, 44 pages, The Internet Society.
Non-Published commonly owned U.S. Appl. No. 16/945,909, filed Aug. 2, 2020, 36 pages, Nicira Inc.
Popa, Lucian, et al., "Building Extensible Networks with Rule-Based Forwarding," In USENIX OSDI, Month Unknown 2010, 14 pages.
Sekar, Vyas, et al., "Design and Implementation of a Consolidated Middlebox Architecture," 9th USENIX Symposium on Networked Systems Design and Implementation, Apr. 25-27, 2012, 14 pages, USENIX, San Jose, CA, USA.
Sherry, Justine, et al., "Making Middleboxes Someone Else's Problem: Network Processing as a Cloud Service," In Proc. of SIGCOMM '12, Aug. 13-17, 2012, 12 pages, Helsinki, Finland.

\* cited by examiner
‡ imported from a related application

SECURE KEY MANAGEMENT PROTOCOL FOR DISTRIBUTED NETWORK ENCRYPTION

CLAIM OF BENEFIT TO PRIOR APPLICATIONS

This application is a continuation application of U.S. patent application Ser. No. 15/421,377, filed Jan. 31, 2017, now published as U.S. Patent Publication 2018/0063103. U.S. patent application Ser. No. 15/421,377 claims the benefit of U.S. Provisional Patent Application 62/380,338, filed Aug. 26, 2016. U.S. patent application Ser. No. 15/421,377, now published as U.S. Patent Publication 2018/0063103 and U.S. Provisional Patent Application 62/380,338 are incorporated herein by reference.

BACKGROUND

Enterprises (e.g., financial service providers, healthcare providers, critical infrastructure providers, etc.) store valuable data, and transfer it over networks. Overlay networks on a public network are susceptible to threats such as snooping, man in the middle attack (MITM), and forging. As enterprises widely adopt cloud-based Software-Defined Data Center (SDDC) instead of dedicated datacenters, new challenges are introduced, and protecting the data flowing into, within, and out of the cloud becomes a necessity. The privacy guarantee of private datacenters is no longer assumed, and threats similar to those in the Internet prevail.

Cryptography protects data and communication channels from malicious parties, provides confidentiality to enterprise dataflow in the cloud, and provides control over the data to the enterprise. With increased virtualization, managing access to encryption keys becomes more challenging. One possible solution would distribute keys to hosts that have been verified as trusted. However, such an approach provides hosts with access to keys that are not necessary for the hosts to have, and provides more opportunities for compromising the encryption scheme.

BRIEF SUMMARY

For a hypervisor of a host that executes one or more guest virtual machines, some embodiments of the invention provide a method of providing key management and encryption services. The method initially receives an encryption key ticket at a hypervisor. The method then uses the encryption key ticket to retrieve an encryption key identified by the ticket from a key manager. When the encryption key has been retrieved, the method uses the encryption key to encrypt a message sent by a data compute node (DCN) executing on the host requiring encryption according to an encryption rule.

A key policy (KP) is defined at a manager. A key policy may be specific to a particular customer, and, in some embodiments, may include a key manager specification (e.g., IP address and port of a key manager), a key specification (e.g., a desired algorithm (e.g., AES) and a key strength (e.g., 256 bits)), and a key rotation specification (e.g., manual or automatic (e.g., every 24 hours)).

A controller is responsible for each KP. In some embodiments, a cluster of controllers is employed, each controller responsible for one or more KPs. In such an embodiment, the controller responsible for a particular KP is referred to as the logical master of the KP and generates a security parameter index (SPI) or set of SPIs and a key identifier (KID) or set of KIDs. In those embodiments for which a set of SPIs and a set of KIDs are generated they may further be grouped in SPI/KID pairs (e.g., $\{SPI_i, KID_i\}_{0 \leq i \leq n}$). In some embodiments, the SPI identifies security properties (e.g., key length, encryption algorithm, etc.) of the secure connection.

Controllers in the cluster of controllers, in some embodiments, are also responsible for distributing encryption rules and other information received from the manager to a set of hypervisors. In such embodiments, a controller responsible for distributing information to a particular hypervisor is called the physical master of the hypervisor. Each encryption rule defines conditions for which a data message sent by a DCN must be encrypted. Each encryption rule refers to a single key policy. In some embodiments, a single encryption rule may apply to a number of hypervisors and each hypervisor may have multiple encryption rules applied to it. The encryption rules that apply to a hypervisor define whether key policies apply to that hypervisor. A KP span is defined as the set of hypervisors for which a rule or rules that refer to the KP are applied.

In some embodiments, an encryption key ticket is generated for a hypervisor by the controller that is the physical master of the hypervisor based on a SPI/KID pair (e.g., $\{SPI_j, KID_j\}$). To implement the principle of least privilege, in some embodiments, a controller only generates a ticket for a hypervisor based on a SPI/KID pair if the key policy applies to the hypervisor (i.e., if the hypervisor is within the KP's span). The ticket acts as a security token in retrieving encryption keys from a key manager. In some embodiments, the key manager from which a particular key should be retrieved is identified in the key policy. Ticket distribution and encryption rule distribution are independent of each other in some embodiments.

The ticket includes a KID, a hypervisor identifier, an expiry of the ticket, and a controller signature. In some embodiments, a key algorithm and key strength may be sent along with the ticket or the ticket may include the key algorithm and key strength information. The information contained in the ticket is contained in fields of the ticket in some embodiments.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

For a host that executes one or more guest virtual machines, some embodiments of the invention provide a method of providing key management and encryption services. The method initially receives an encryption key ticket, also called a token or voucher, at a host. The method then uses the encryption key ticket to retrieve an encryption key identified by the ticket from a key manager. When the encryption key has been retrieved, the method uses the encryption key to encrypt a data message sent by a guest virtual machine executing on the host. Other aspects of the encryption architecture and method are disclosed in greater detail in U.S. Patent Publication 2015/0379277, which is incorporated herein by reference.

As used in this document, the term data message refers to a collection of bits in a particular format sent across a network. It should be understood that the term data message may be used herein to refer to various formatted collections of bits that may be sent across a network, such as Ethernet frames, IP packets, TCP segments, UDP datagrams, etc. While the examples below refer to data messages, it should be understood that the invention should not be limited to any specific format or type of data message. Also, as used in this document, references to L2, L3, L4, and L7 layers (or layer 2, layer 3, layer 4, layer 7) are references respectively to the second data link layer, the third network layer, the fourth transport layer, and the seventh application layer of the OSI (Open System Interconnection) layer model.

Figure 1:
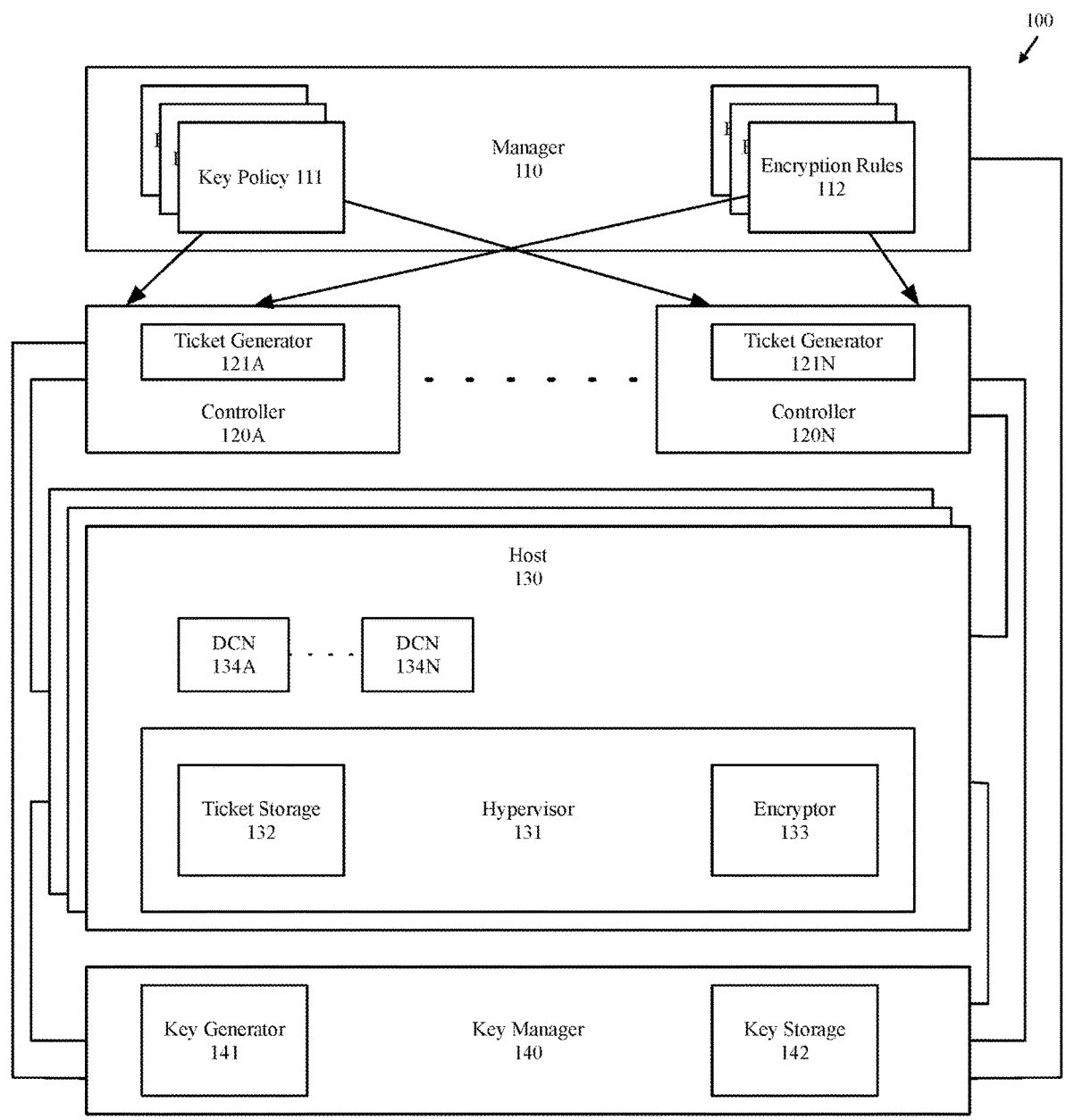
FIG. 1 illustrates an encryption system of some embodiments.

FIG. 1 illustrates an encryption system 100 of some embodiments for implementing the method of providing key management and encryption services. FIG. 1 illustrates a manager 110, a set of controllers 120A-120N, a set of ticket generators 121A-121N, a host 130 in a set of hosts, and a key manager 140.

Manager 110 generates a set of key policies 111 and a set of encryption rules 112. In some embodiments manager 110 is a set of managers at which a set of key policies 111 and a set of encryption rules 112 are generated. In some embodiments, a key policy (KP) is specific to a particular customer. In some embodiments, a KP includes a key manager specification (e.g., IP address and port of a key manager, and its certificate), a key specification (e.g., a desired algorithm (e.g., AES) and a key strength (e.g., 256 bits)), and a key rotation specification (e.g., manual or automatic (e.g., every 24 hours)). Each encryption rule in the set of encryption rules 112 defines conditions under which a data message from a DCN (e.g., DCN 134A through 134N) requires encryption and refers to a key policy in the set of key policies 111. Additionally, key policies and encryption rules specify whether the encryption provided is encryption and integrity or integrity only.

Manager 110 is also responsible for initiating a key revocation and communicating with the set of controllers 120A-120N to implement key revocation. Key revocation is necessary when there is reason to suspect that a key has been compromised and its usage should therefore be stopped immediately (i.e., before a planned key rotation specified in a KP). Such reasons may be the detection of suspicious activity indicative of a cryptographic attack or that a preset amount of data has been encrypted using that encryption key.

Each controller in the set of controllers 120A-120N is responsible for a KP or set of KPs and is called the logical master of the particular KPs for which it is responsible. The controller that is the logical master of a particular KP generates a security parameter index (SPI) or set of SPIs and a key identifier (KID) or set of KIDs for the particular KP. In those embodiments for which a set of SPIs and a set of KIDs are generated they may further be grouped in SPI/KID pairs (e.g., $\{SPI_i, KID_i\}_{0 \leq i \leq n}$). In some embodiments, the SPI identifies security properties (e.g., key length, encryption algorithm, etc.) of the secure connection. Generating multiple sets of {SPI, KID} has at least two advantages: it allows dedicating one {SPI, KID} for AES-NI support and the data plane gets flexibility to choose from a set of keys instead of one key for encryption and decryption. In some embodiments, a KID is used to refer to a secret key. The KP to $\{SPI_i, KID_i\}_{0 \leq i \leq n}$ mapping is saved in a shared and persistent storage (e.g., Zookeeper) across the controller cluster in some embodiments.

In some embodiments, KPs are assigned to controllers based on a sharding mechanism (e.g., the sharding mechanism provided by the NSX core platform). One example of a sharding mechanism is a mechanism in which each controller is assigned slices (ranges of numbers such as 1-1000, 1001-2000, etc.). In such embodiments, to check whether a controller node is mastering an entity with identifier X, a check is made to determine if X falls in a slice assigned to that controller.

As shown in FIG. 1, controller 120A also includes ticket generator 121A. Ticket generator 121A generates tickets for the hypervisors for which the controller is a physical master based on a KP if the KP applies to the host. Whether a KP applies to a hypervisor is determined by the encryption rules in the set of encryption rules 112 that apply to the hypervisor and reference particular KPs. Ticket generation will be more fully described in FIG. 3 and the relation between KPs, encryption rules, and hypervisors will be described in FIG. 2.

Each of controllers 120A-120N may also be responsible for distributing encryption rules and other information received from manager 110 to a particular hypervisor (e.g., hypervisor 131) and is called the physical master of the hypervisor. The distribution of encryption rules and other information received from manager 110 in some embodiments is independent of ticket distribution. Separating encryption rule distribution from ticket distribution allows hypervisors to have access to all the encryption rules while having access to only those encryption keys for which it currently has need. Additionally, separating the distribution of encryption rules from tickets allows tickets and encryption rules to be updated differently (e.g., according to different schedules, using different communication channels or protocols, etc.) and protected differently (e.g., applying different strength encryption to tickets and encryption rules).

In some embodiments, upon receiving a key revocation instruction from manager 110, controller 120A communicates with the hypervisors for which it is the physical master and key manager 140 to implement a key revocation. As part of the key revocation and as part of a key rotation, a logical master generates a new set of SPI/KID pairs for the revoked encryption key's key policy. A physical master then generates new tickets based on the new set of SPI/KID pairs to send to the hypervisors for which it is responsible.

A host 130 in a plurality of hosts includes a hypervisor 131. Hypervisor 131 maintains a ticket storage 132 to store tickets received from the controller that is the physical master for the host. Hypervisor 131 may also include an encryptor 133 for encrypting data messages received from DCNs 134A-134N that are hosted by host 130. It is to be understood that that a ticket storage and encryptor in some embodiments are executing as modules on the host instead of in the hypervisor.

Hypervisor 131 in some embodiments stores (e.g., in RAM) encryption keys retrieved from key manager 140 through a secure connection (e.g., SSL or TLS). A stored key is used to encrypt data messages requiring encryption according to an encryption rule that points to the encryption KID for which the encryption key was retrieved. In some embodiments, newly retrieved keys are used after a particular amount of time (e.g., a user-configured time for manual key rotation, or a predetermined time for automatic key rotation) to allow most or all of the hypervisors to retrieve all the keys necessary for network encryption. If hypervisor 131 receives a key revocation for a stored key from its physical master, it immediately stops using the stored encryption key. During the time after a key is revoked and before the hypervisor 131 retrieves a new key traffic is allowed or dropped according to a general default action or a specific default action defined in the applicable encryption rule.

Key Manager 140 registers with manager 110 and obtain certificates (e.g., a public key) for manager 110, controllers 120A-120N, and hypervisors. These certificates are used to verify a ticket as described in relation to FIG. 5. By having the key manager 140 obtain certificates at the time of registration, the system avoids communication between manager 110, controllers 0120A-120N, and key manager 140 at the time a key is requested for a particular ticket.

Key manager 140 includes a key generator 141 for generating keys based on a key request as will be described in relation to FIGS. 4 and 5. Key manager 140 also includes a key storage 142 for storing keys that have been generated based on a key request as will be described in relation to FIGS. 4 and 5. Keys stored in key storage 140 are returned for subsequent requests for the same key as will be described in relation to FIGS. 4 and 5. In some embodiments, keys stored in key storage 142 are encrypted with a key encryption key (KEK). In some embodiments, the KEK are secured in a password protected read-only file and loaded in to the memory of key manager 140 during an initial stage with input from a human administrator.

In some embodiments, key manager 140 is an enterprise key manager (KM) appliance (e.g., a hardware appliance, or software module hardened for security), and it is responsible for storing and managing a large number of keys. Key manager 140, in some embodiments, is a third party key manager. When the encryption system 100 is used in a multi-tenant datacenter, several different key managers provide key-management operations for several different tenants in the datacenter. In other words, each of several different tenants has their own unique set of one or more key managers that the tenant does not share with any other tenant. In some embodiments, however, one key manager might be shared between multiple tenants.

In some embodiments, elements represented in FIG. 1 as a plurality of instances may be a single instance and elements represented as a single instance may be implemented as a plurality of instances. Additionally, references made to hypervisors are to be understood to apply equally to hosts where functions attributed to the hypervisor are capable of being performed by programs or modules executing on the host.

Figure 2:
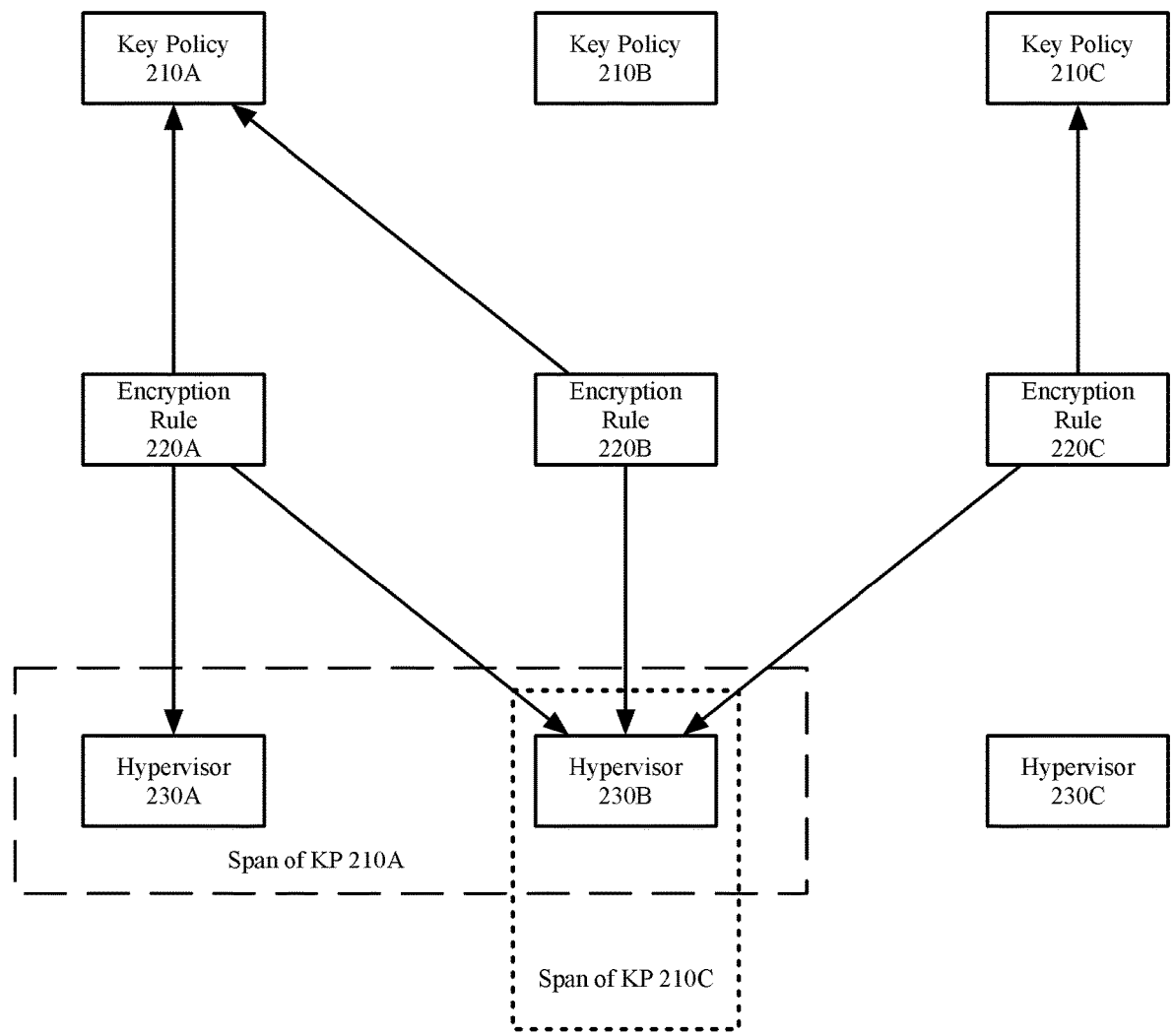
FIG. 2 illustrates the relationship between key policies, key rules, hypervisors and key span.

FIG. 2 illustrates the relationship between key policies 210A-210C, encryption rules 220A-220C, hypervisors 230A-230C, and KP span. FIG. 2 illustrates three key policies 210A-210C that are available for application at different hypervisors in encrypting data messages sent from DCNs executing on the host. Each of encryption rules 220A-220C refers to one KP. As shown in FIG. 2, multiple rules may refer to a single KP (e.g., encryption rules 220A and 220B each refer to KP 210A), a single rule may refer to a particular KP (e.g., encryption rule 220C refers to KP 210C), or no rules may refer to a particular KP (e.g., KP 210B).

FIG. 2 also illustrates the application of encryption rules to hypervisors 230A-230C. As shown in FIG. 2, multiple rules may apply to a single hypervisor (e.g., encryption rules 220A-220C each apply to hypervisor 230B), a particular hypervisor may have a single rule applied (e.g., encryption rule 220A applies to hypervisor 230A), a single rule may apply to multiple hypervisors (e.g., encryption rule 220A applies to hypervisors 230A and 230B), or no rules may apply to a particular hypervisor (e.g., hypervisor 230C). The set of hypervisors to which a particular KP applies defines the span of the KP.

The span of a particular KP is defined by the encryption rules that refer to that KP. For example, the span of KP 210A is shown in the dashed line as including hypervisors 230A and 230B. hypervisors 230A and 230B both have encryption rules applied to them that refer to KP 210A (encryption rule 220A applies to hypervisor 230A and refers to KP 210A; encryption rules 220A and 220B apply to hypervisor 230B and each refers to KP 210A). As a further example, the span of KP 210C is shown by the dotted line and includes only hypervisor 230B (encryption rule 220C applies to hypervisor 230B and refers to KP 210C). In FIG. 2, KP 210B has no span because it is not applied to any host. The examples provided in FIG. 2 represent a static view of KP span, however, as described in U.S. Patent Publication 2015/0379277, the rules and policies applicable to a given hypervisor may change over time.

Figure 3:
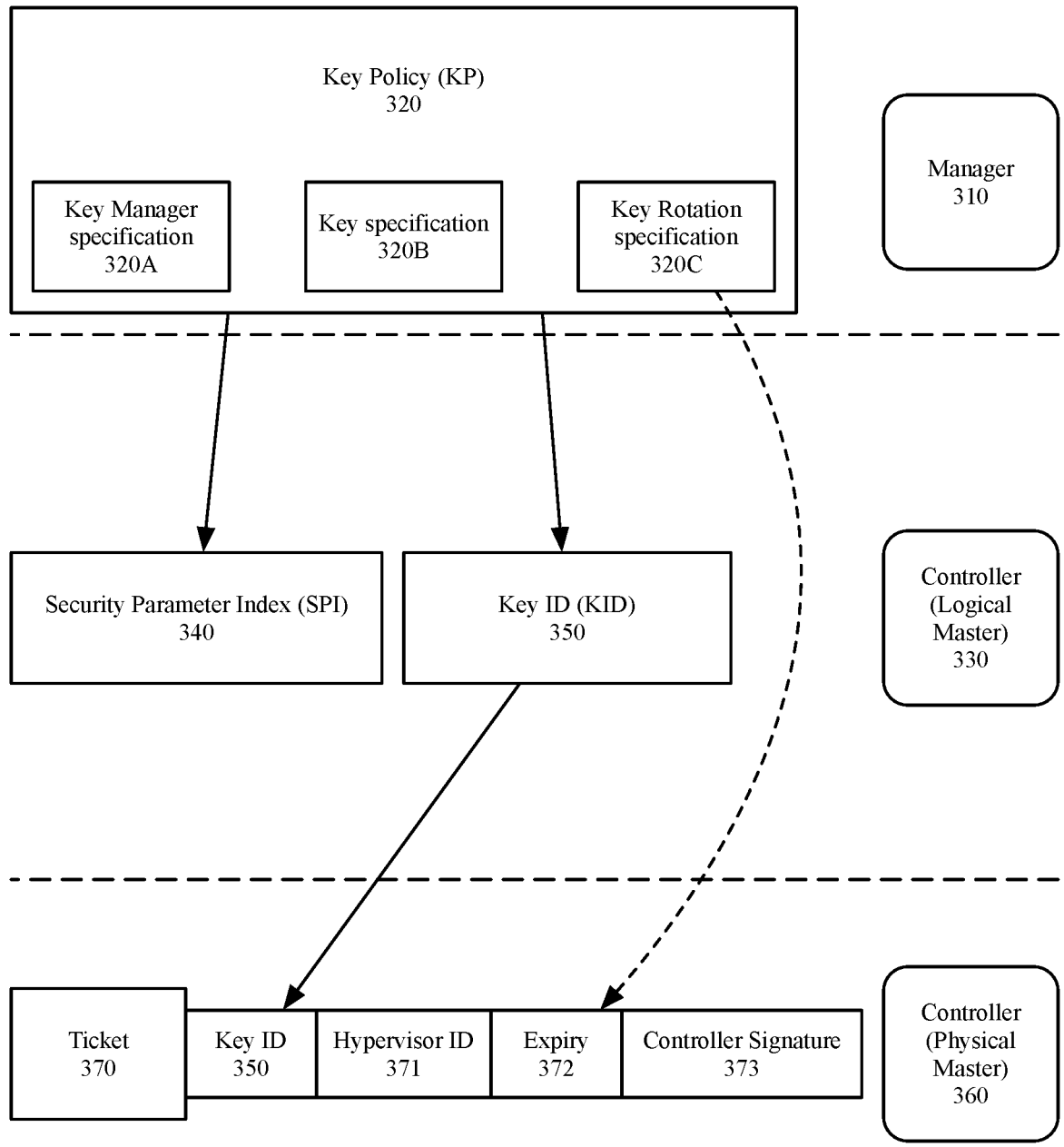
FIG. 3 illustrates ticket generation of some embodiments.

FIG. 3 illustrates the relation of a manager, a logical master of a key policy, and a physical master of a hypervisor in ticket generation of some embodiments of the invention. FIG. 3 illustrates a manager 310 at which a key policy 320 is defined. In some embodiments, key policy 320 may include any or all of a key manager specification 320A (e.g., IP address and port of a key manager), a key specification 320B (e.g., a desired algorithm (e.g., AES), and a key strength (e.g., 256 bits)), and a key rotation specification 320C (e.g., manual or automatic (e.g., every 24 hours)).

A controller 330 acting as the logical master of KP 320 generates a security parameter index (SPI) 340 and a key ID (KID) 350 based on the KP 320. In some embodiments, instead of generating a single SPI 340 and KID 350 the controller generates a set of pairs of SPI and KID (e.g., $\{SPI_i, KID_i\}_{0 \le i \le n}$) (not shown).

A controller 360 also acts as the physical master of a hypervisor to generate a ticket 370. In some embodiments, the logical master of a KP and the physical master of a hypervisor are the same controller for a particular KP/hypervisor pair while for a different KP/hypervisor pair the logical master of the KP and the physical master of the hypervisor are different controllers. Ticket 370 in some embodiments includes key ID 350, hypervisor ID 371, expiry 372, and controller signature 373. In some embodiments, the ticket includes each of key ID 350, hypervisor ID 371, expiry 372, and controller signature 373 in a separate field.

Key ID 350 in ticket 370 is the KID 350 generated by the logical master of the KP. Key ID 350 is used by the key manager as will be described in FIG. 5 to identify a correct encryption key to return when a hypervisor requests a key. In some embodiments, key ID 350 is used in tickets generated for different hypervisors and when received by a key manager point to the same encryption key.

Hypervisor ID 371 identifies the hypervisor for which ticket 370 is generated. Hypervisor ID 371 is used by a key manager to identify the hypervisor to which an encryption key is returned.

Expiry 372 identifies the expiration of the particular ticket and is based on key rotation specification 320C. Controller signature 373 identifies the controller that generated the ticket 370. As described in FIG. 5, the expiry of the ticket and the controller signature are used to determine if a ticket is valid and whether to return the identified encryption key.

Figure 4:
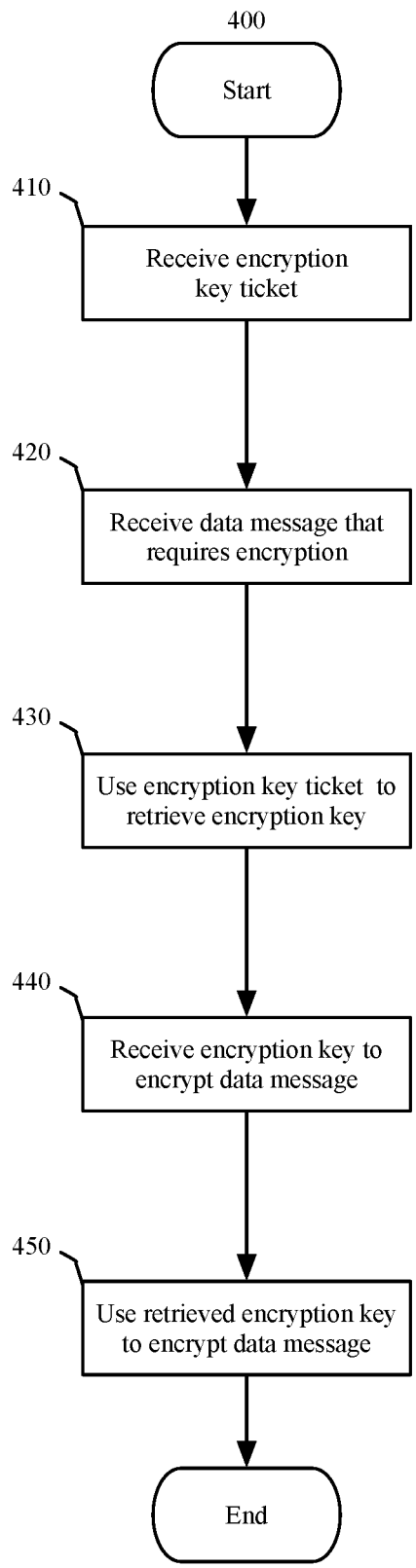
FIG. 4 illustrates an encryption process using a ticket to retrieve encryption keys for encrypting data messages sent from a guest virtual machine.

FIG. 4 conceptually illustrates a process 400 that implements the novel method of some embodiments of the invention. In some embodiments, the process 400 is performed by an encryption management module on a host on which multiple machines (e.g., virtual machines, containers, etc.) execute. In some embodiments, this module is part of the hypervisor (e.g., a module of a hypervisor providing encryption services to virtual machines running on the hypervisor). The encryption management module coordinates the use of tickets received from a controller to retrieve encryption keys from a key manager and perform encryption according to applicable encryption rules.

As shown, the process 400 begins when the encryption management module receives (at 410) an encryption key ticket. The encryption key ticket is generated at a controller for a particular hypervisor based on an encryption rule and key policy that apply to the hypervisor as described above in relation to FIGS. 1 and 2. The controller in some embodiments generates new tickets based on an event (e.g., receipt of a new key policy or encryption rule from a manager, or a VM being migrated to or from a hypervisor so that a key policy's applicability to the hypervisor changes, etc.) that requires a new ticket to be generated for a hypervisor.

The encryption key ticket in some embodiments contains an encryption key identifier, a hypervisor identifier, an expiry, and a controller signature used to verify the validity of the ticket and identify the proper encryption key at the key manager.

The process 400 then receives (at 420) a data message (e.g., Ethernet frame, IP packet, TCP segment, UDP datagram, etc.) that requires encryption according to an encryption rule referring to the key policy for which the ticket was generated. In some embodiments, a determination that a data message requires encryption is made as disclosed in U.S. Patent Publication 2015/0379277.

The process 400 then uses (at 430) the ticket to retrieve an encryption key from a key manager. To retrieve the encryption key, the process in some embodiments sends an encryption key request that includes the ticket to the key manager. In some embodiments, the ticket includes a desired key algorithm and key length, while in others the key algorithm and key length are separately specified in the request. The key manager verifies the ticket and returns an encryption key based on the request. FIG. 5 conceptually illustrates the key manager process for verifying a ticket and returning an encryption key.

After the key manager verifies the ticket and returns a key based on the request, the process receives (at 440) the encryption key for encrypting the data message from the key manager. The process then proceeds to 450 to use the retrieved encryption key to encrypt the data message received (at 420) and ends. In some embodiments, the encryption management module uses the retrieved encryption key to provide an integrity check value (ICV) (e.g., checksum) only, while in other embodiments the encryption includes both encrypting the data and providing an ICV. A single encryption module in some embodiments provides other types of encryption based on a specification in a key policy that applies to the particular data message. Other variations of the encryption may include encrypting different portions of the data messages (e.g., encrypting just the L2 payload, encrypting the L2 header and payload, the hash value that results from the ICV calculation along with the payload, etc.), using different encryption algorithms (e.g., using AES128GCM encryption versus using AES256GCM encryption, or using AES-GCM encryption versus using AES-CBC/SHA1-HMAC encryption, or using AES encryption versus using 3DES encryption).

It is to be understood that process 400 may also be used to retrieve an encryption key for a data message that must be decrypted. In such a decryption process an encrypted data message would be received (at 420) for which the process does not have a decryption key.

It is also to be understood that process 400 may retrieve an encryption key (at 430) before receiving a data message that requires encryption.

Figure 5:
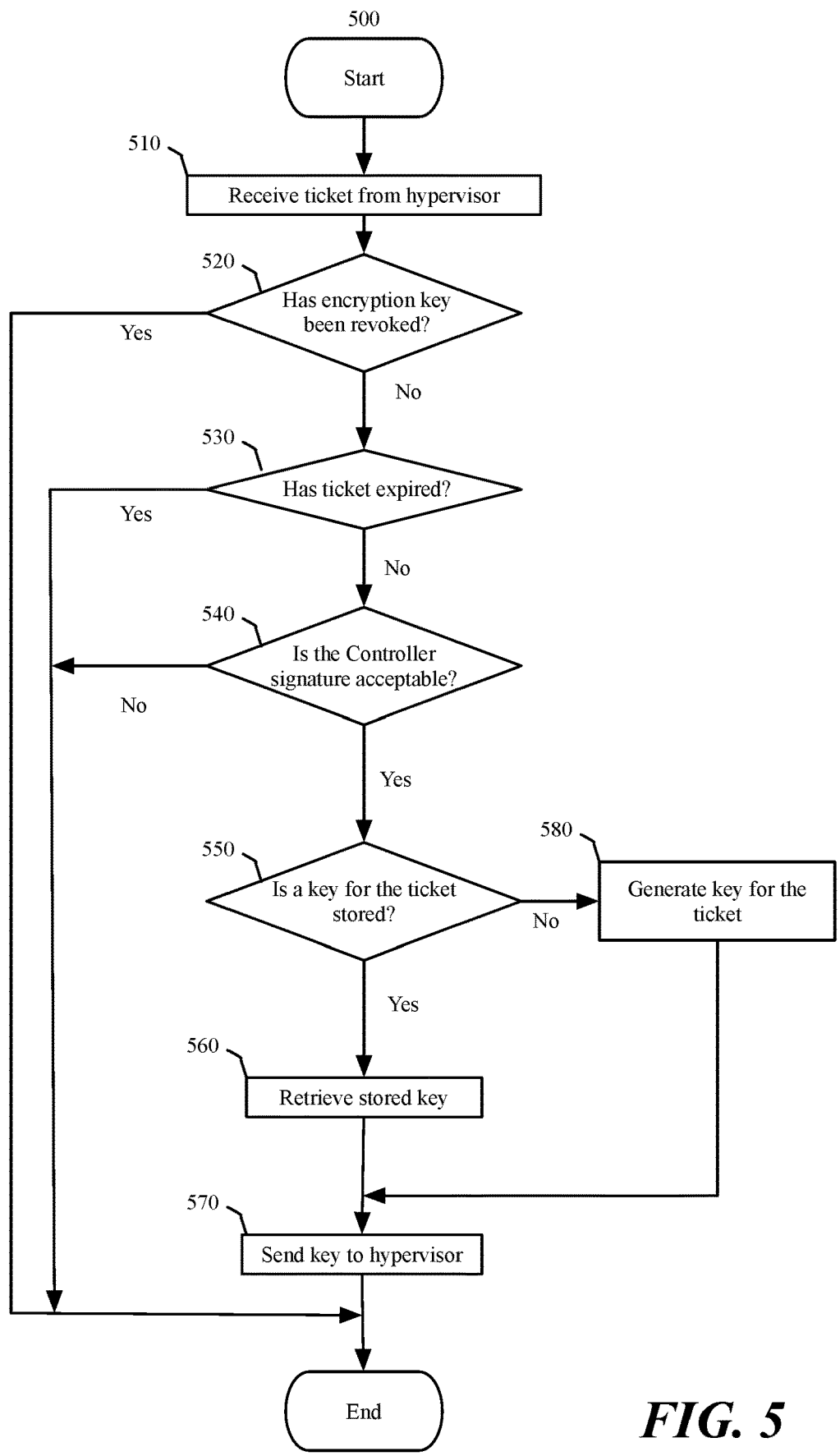
FIG. 5 illustrates a process for verifying a ticket and providing an encryption key based on the ticket.

FIG. 5 conceptually illustrates a process 500 for verifying a ticket and providing an encryption key based on an encryption key ticket. In some embodiments, the process 500 is performed by a key manager (e.g., a third-party key manager or a hardened server providing secure key storage and distribution services). The key manager verifies encryption key tickets and generates or retrieves encryption keys based on requests from hypervisors.

The process 500 begins by receiving (at 510) a ticket from a hypervisor as part of a request for an encryption key. As noted above the request in some embodiments includes a ticket as well as a desired key algorithm and key length. It is to be understood that in different embodiments additional information may be incorporated in the ticket or may be separate information included in the request.

The process determines (at 520) whether the key manager has received an instruction revoking an encryption key from a controller. In some embodiments, the key manager receives an instruction to revoke an encryption key from the controller when the controller determines that there is reason to suspect that a key has been compromised. If the process determines that a key revocation instruction has been received for the received ticket, the process ends. If the process determines that no revocation instruction has been received the process continues to 530.

The process 500 then determines (at 530) whether the ticket has expired by examining the expiry field of the ticket. A key policy specifies an expiry of a ticket in some embodiments. The expiry condition in some embodiments is time-based and in others is based on an amount of data encrypted using the encryption key. If the process determines (at 530) that the ticket has expired, it ends the process without sending an encryption key to the requesting host.

If the process 500 determines (at 530) that the ticket has not expired the process verifies the controller signature (at 540). In some embodiments, key manager verifies the controller signature using the public key of the controller to verify that the controller is authorized to generate tickets for the particular encryption key. In some embodiments, the key manager receives the controller certificates through a registration process of the key manager. If the process (at 540) fails to verify the controller signature, the process ends without sending an encryption key to the requesting host. If the process verifies the controller signature (at 540) as an authorized controller signature the process proceeds to 550 to determine whether a key for the ticket is already stored in a memory of the key manager.

The process 500 determines (at 550) whether an encryption key corresponding to the key ID ticket has already been generated and stored in a memory. The discussion of step 580 addresses encryption key generation and storage based on a request. If the process 500 determines (at 550) that a key storage stores a corresponding key for the key ID of the ticket, it retrieves the key (at 560) and sends the key to the requesting hypervisor at 570.

If the process 500 determines (at 550) that the corresponding encryption key for the ticket is not stored in the memory of the key manager, the process generates (at 580) a corresponding encryption key for the key ID of the ticket based on the request. The particular encryption key generated is based on the key ID included in the ticket as well as the key algorithm and key length specified in the encryption key request. Once an encryption key has been generated, process 500 stores the key in a key storage and proceeds to send (at 570) the generated encryption key to the hypervisor and the process ends.

Figure 6:
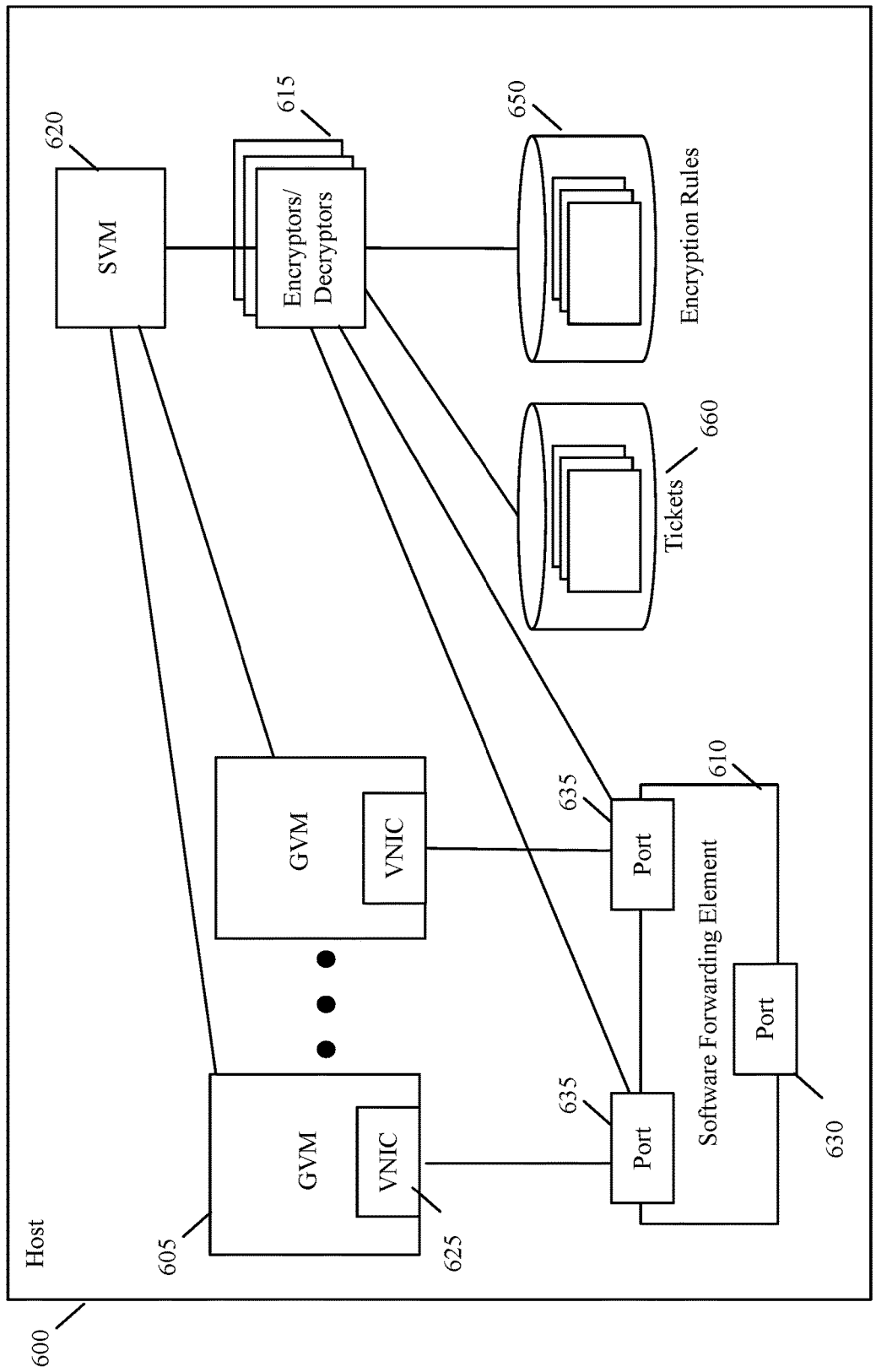
FIG. 6 illustrates a host encryption architecture of some embodiments.
Figure 7:
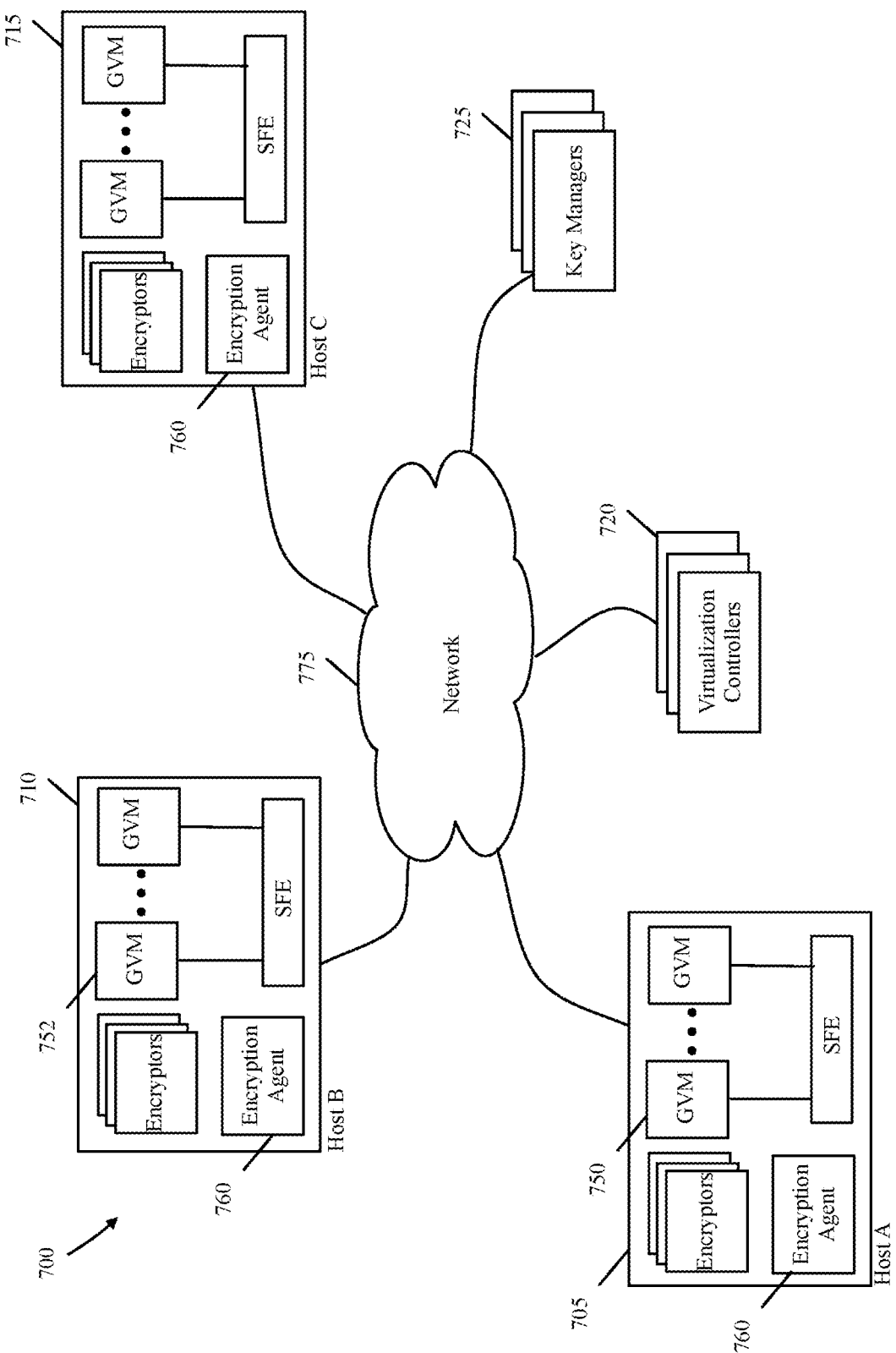
FIG. 7 illustrates an encryption system of some embodiments.

FIGS. 6 and 7 are provided as an example of a system in which the invention may be implemented. FIG. 6 illustrates one architecture for a host 600 to intercept and encrypt outgoing guest VM (GVM) data messages, and to intercept and decrypt incoming GVM data messages. Specifically, FIG. 6 illustrates a host 600 that executes multiple GVMs 605, a software forwarding element 610, a set of one or more encryptors/decryptors 615 (referred to as the "encryptor set"), a malware-detecting SVM 620, and a hypervisor (not shown). In some embodiments, the encryptor set 615 executes in a kernel space.

The hypervisor (e.g., hypervisor 131) is a software layer (e.g., an application) over which the GVMs 605, software forwarding element 610, and other host encryption modules execute.

The software forwarding element (SFE) 610 executes on the host to communicatively couple the GVMs of the host to each other and to other devices (e.g., other GVMs) outside of the host. As shown, the SFE 610 includes a port 630 to connect to a physical network interface card (NIC) of the host, and a port 635 to connect to the virtual NIC (VNIC) 625 of each GVM. In some embodiments, the VNICs are software abstractions of the physical NIC (PNIC) that are implemented by the virtualization software (e.g., by a hypervisor). Each VNIC is responsible for exchanging data messages between its GVM and the SFE 610 through its corresponding SFE port. As shown, a GVM's egress datapath for its data messages includes (1) the GVM's VNIC 625, (2) the SFE port 635 that connects to this VNIC, (3) the SFE 610, and (4) the SFE port 630 that connects to the host's PNIC.

Through its port 630 and a NIC driver (not shown), the SFE 610 connects to the host's PNIC to send outgoing data messages and to receive incoming data messages. The SFE 610 performs message-processing operations to forward messages that it receives on one of its ports to another one of its ports. For example, in some embodiments, the SFE tries to use header values in the GVM data message to match the message to flow based rules, and upon finding a match, to perform the action specified by the matching rule (e.g., to hand the data message to one of its ports 630 or 635, which directs the data message to be supplied to a destination GVM or to the PNIC). In some embodiments, the SFE 610 is a software switch, while in other embodiments it is a software router or a combined software switch/router.

The SFE 610 in some embodiments implements one or more logical forwarding elements (e.g., logical switches or logical routers) with SFEs executing on other hosts in a multi-host environment. A logical forwarding element in some embodiments can span multiple hosts to connect GVMs that execute on different hosts but belong to one logical network. In other words, different logical forwarding elements can be defined to specify different logical networks for different users, and each logical forwarding element can be defined by multiple SFEs on multiple hosts. Each logical forwarding element isolates the traffic of the GVMs of one logical network from the GVMs of another logical network that is serviced by another logical forwarding element. A logical forwarding element can connect GVMs executing on the same host and/or different hosts.

The ports 635 in some embodiments include one or more function calls to one or more modules that implement special input/output (I/O) operations on incoming and outgoing data messages that are received at the ports. One of these function calls for a port is to an encryptor/decryptor in the encryptor/decryptor set 615. As further described below, the encryptor/decryptor performs the encryption/decryption rule check and the encryption/decryption operations on outgoing/incoming data messages (i.e., on messages that are sent by one of the GVMs and/or that are received by the host for one of the GVMs). In some embodiments, each port 635 has its own encryptor/decryptor 615, while in other embodiments, some or all of the ports 635 share the same encryptor/decryptor 615 (e.g., all the ports share one encryptor/decryptor, or all ports that are part of the same logical network share one encryptor/decryptor).

Examples of other I/O operations that are implemented by the ports 635 include message encapsulation operations needed for sending messages along tunnels to implement overlay logical network operations. By implementing a stack of such function calls, the ports can implement a chain of I/O operations on incoming and/or outgoing messages in some embodiments. Instead of calling the I/O operators (including the encryptor set 615) from the ports 635, other embodiments call these operators from the GVM's VNIC or from the port 630 of the SFE. For instance, as further described below, the port 630 in some embodiments calls a decryptor when it receives an encrypted GVM message from outside of its host and the GVM message has its L2 payload and L2 header values encrypted. The port 630 in some embodiments calls the decryptor 615 to decrypt this L2 encrypted message so that it can obtain the L2 header value that the SFE 610 needs to identify the port 635 to which it needs to pass the GVM data message.

In some embodiments as depicted in FIG. 6, a determination that a data message should be encrypted based on a set of one or more encryption rules (which is implicit in step 420 of FIG. 4) is made by (1) a port 635 relaying to its encryptor 615 the GVM data message that the port 635 receives from the VNIC 625 of the GVM that sent the message, and (2) the encryptor 615 using the GVM message's attributes to examine encryption rules that are stored in an encryption rule data store 650 of the host. In some embodiments, the port 635 relays the GVM message by passing to the encryptor 615 a reference (e.g., a handle that identifies a location in memory that stores the GVM message) to the GVM message.

The GVM message attributes that the encryptor/decryptor uses in some embodiments to check the encryption/decryption rules include the message header values. For instance, the encryptor in some embodiments determines whether it should encrypt a GVM data message by using the data message's header values (e.g., its L2-L4 attributes) to identify an encryption rule that is applicable to the GVM data message. For an L2 frame, the header values include the source and destination MAC addresses, while for an L3/L4 data message, the header values are the five tuple identifiers, which include the data message's source identifier, destination identifier, source port, destination port, and protocol (service). Also, in some embodiments, one or more of the identifier values can be logical values that are defined for a logical network (e.g., can be virtual network identifier (VNI) for a VXLAN overlay network, or a logical IP addresses defined in a logical address space). In other embodiments, all of the identifier values are defined in the physical domains. In still other embodiments, some of the identifier values are defined in logical domain, while other identifier values are defined in the physical domain.

To determine whether the GVM data message should be encrypted, the encryptor 615 uses the GVM message attributes to examine the encryption rules stored in the encryption rule data store 650, in order to determine whether this data store 650 contains a rule that identifies an encryption key policy for encrypting the received GVM data message. Similarly, to decrypt at least some of the encrypted data messages, a decryptor 615 in some embodiments uses the message attributes of these encrypted data messages to search the encryption rules stored in the encryption rule data store 650 to identify a rule that identifies a key policy for decrypting the received GVM data message. In some embodiments, the decryptor 615 identifies a key policy for decrypting a received encrypted GVM data message by using a key identifier that is inserted in the GVM data message by the encryptor of this message or by another module at the direction of this encryptor. The processes for decrypting encrypted messages will be further described below.

When an encryption rule identifies a key policy for encrypting the received GVM data message, encryptor 615 in some embodiments determines if a key identified in the key policy is stored in a key storage of the host (not shown). If the key identified by the key policy is not stored in the key storage the encryptor 615 sends a request to a key manager (e.g., key manager 140). As discussed above in relation to FIG. 4, a request includes a ticket that encryptor 615 may retrieve from ticket store 660, a key algorithm, and a key length. The key manager that receives the request performs process 500.

When the encryptor 615 determines that it should encrypt the GVM data message and retrieves a key from a local key storage (not shown) or from a key manager (e.g., key manager 140), it then retrieves the GVM data message from memory (e.g., at a location provided by the SFE port or GVM VNIC that called the encryptor), encrypts the data message and passes the encrypted data message back to the SFE port 635 that called it. The SFE port 635 then sends the encrypted data message along the message's datapath.

FIG. 7 illustrates the encryption system 700 of some embodiments. As shown, this system includes multiple virtualized hosts 705-715, a set of controllers 720, and a set of key managers 725. The virtualized hosts 705-715 are similar to the host 600 of FIG. 6, except that the hosts 705-715 each are shown to include an encryption agent 760 for interacting with the controller set 720 and the key manager set 725. In FIG. 7, the SVM 620, ports 630 and 635, VNICs 625, the rule data store 650, and the ticket data store 660 are not shown in order to keep this figure's illustration simple. As shown in FIG. 7, the hosts 705-715, the controller set 720, and the key manager set 725 communicatively couple through a network 775, which can include a local area network (LAN), a wide area network (WAN) or a network of networks (e.g., Internet).

The network controllers 720 provide control and management functionality for defining and managing the instantiation of one or more GVMs on each host (for the purposes of this discussion, network controllers 720 includes both manager 110 and the set of controllers 120 of FIG. 1). These controllers in some embodiments also provide control and management functionality for defining and managing multiple logical networks that are defined on the common software forwarding elements of the hosts. In some embodiments, controllers 720 also create security groups, security policies (including encryption policies), and encryption rules. The key managers provide encryption keys for the various encryption rules that the hosts enforce through the use of tickets. In some embodiments, the key managers also periodically provide new encryption keys for one or more of the encryption rules, in order to make it harder for third parties to break the encryption scheme.

In some embodiments, the hosts for the source and destination GVMs of a GVM data message use encryption and decryption operations that are statically synchronized as they are configured beforehand to use the appropriate encryption/decryption keys for different data messages. For example, when GVMs 750 and 752 on hosts 705 and 710 are part of one logical network, the controller set 720 provides a ticket for the same cryptographic key(s) (e.g., one identical key, or a pair of associated keys that are transformed versions of each other) to both hosts 705 and 710, such that each host uses the provided tickets to retrieve key(s) to encrypt all data messages that it receives from its own GVM 750 or 752, and to decrypt all data messages that it receives from the other host's GVM 752 or 750. In some of these embodiments, the controllers and/or key managers periodically refresh the tickets and keys that the hosts store for their prospective encryption and decryption operations.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 8:
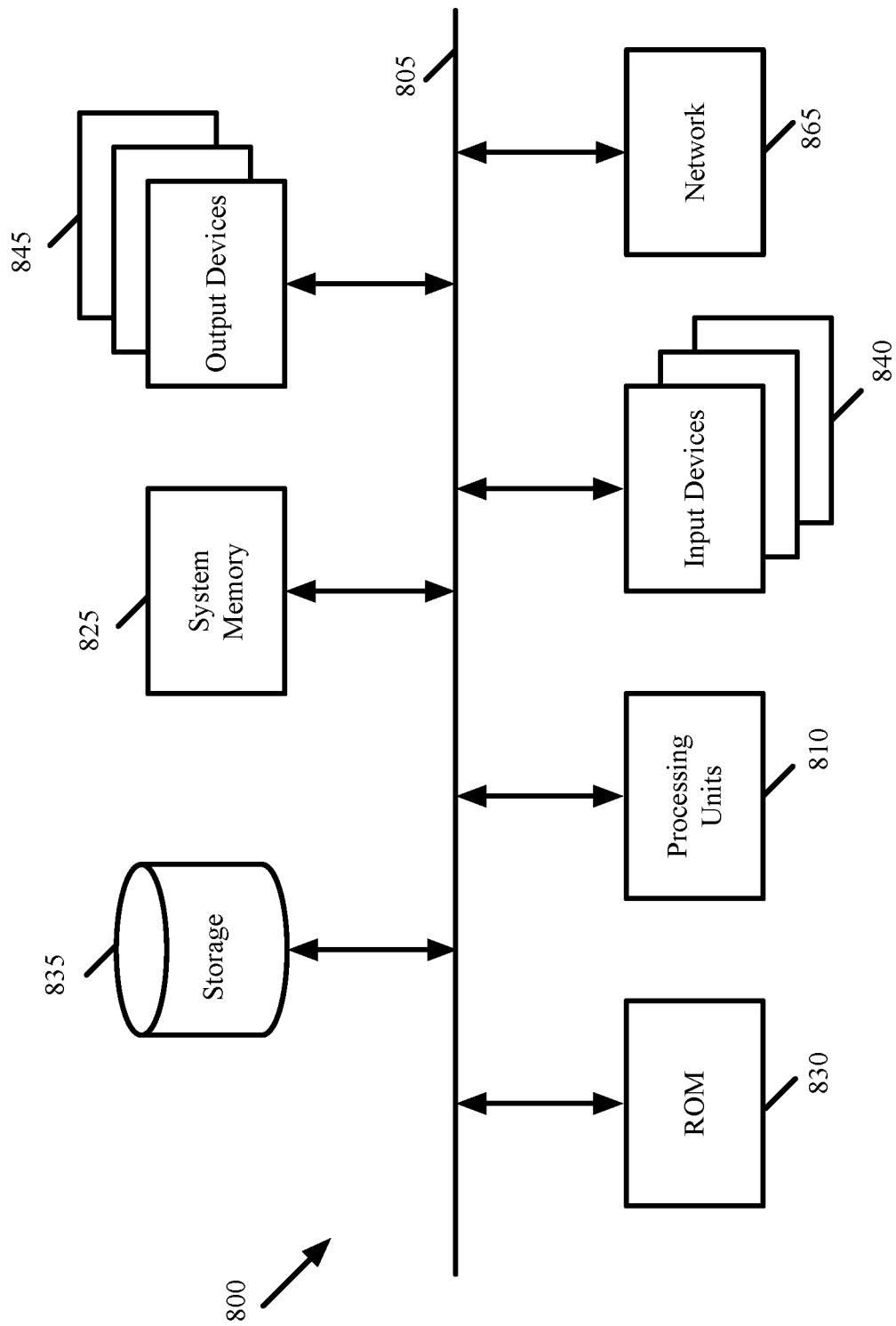
FIG. 8 illustrates a computer system that is used in some embodiments to implement a host computer, a controller computer or a manager computer.

FIG. 8 conceptually illustrates a computer system 800 with which some embodiments of the invention are implemented. The computer system 800 can be used to implement any of the above-described hosts, controllers, and managers. As such, it can be used to execute any of the above described processes. This computer system includes various types of non-transitory machine readable media and interfaces for various other types of machine readable media. Computer system 800 includes a bus 805, processing unit(s) 810, a system memory 825, a read-only memory 830, a permanent storage device 835, input devices 840, and output devices 845.

The bus 805 collectively represents all system, peripheral, and chipset buses that communicatively connect the numerous internal devices of the computer system 800. For instance, the bus 805 communicatively connects the processing unit(s) 810 with the read-only memory 830, the system memory 825, and the permanent storage device 835.

From these various memory units, the processing unit(s) 810 retrieve instructions to execute and data to process in order to execute the processes of the invention. The processing unit(s) may be a single processor or a multi-core processor in different embodiments. The read-only-memory (ROM) 830 stores static data and instructions that are needed by the processing unit(s) 810 and other modules of the computer system. The permanent storage device 835, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 835.

Other embodiments use a removable storage device (such as a floppy disk, flash drive, etc.) as the permanent storage device. Like the permanent storage device 835, the system memory 825 is a read-and-write memory device. However, unlike storage device 835, the system memory is a volatile read-and-write memory, such a random access memory. The system memory stores some of the instructions and data that the processor needs at runtime. In some embodiments, the invention's processes are stored in the system memory 825, the permanent storage device 835, and/or the read-only memory 830. From these various memory units, the processing unit(s) 810 retrieve instructions to execute and data to process in order to execute the processes of some embodiments.

The bus 805 also connects to the input and output devices 840 and 845. The input devices enable the user to communicate information and select commands to the computer system. The input devices 840 include alphanumeric keyboards and pointing devices (also called "cursor control devices"). The output devices 845 display images generated by the computer system. The output devices include printers and display devices, such as cathode ray tubes (CRT) or liquid crystal displays (LCD). Some embodiments include devices such as a touchscreen that function as both input and output devices.

Finally, as shown in FIG. 8, bus 805 also couples computer system 800 to a network 865 through a network adapter (not shown). In this manner, the computer can be a part of a network of computers (such as a local area network ("LAN"), a wide area network ("WAN"), or an Intranet, or a network of networks, such as the Internet. Any or all components of computer system 800 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. For example, several examples of key retrieval tickets were described above. In some of these examples, the key retrieval tickets were described to include a key identifier, the hypervisor identifier, the controller signature, the ticket expiration parameter, a key algorithm, and a key length. These components allow the key manager (1) to authenticate the host's key request by authenticating the controller signature and in some embodiments the hypervisor identifier, (2) to ensure that the ticket has not yet expired, and (3) to identify the key being retrieved.

One of ordinary skill will realize that other embodiments use other forms of tickets. For instance, in some embodiments, the ticket does not include the key identifier as the key manager identifiers or generates the key on its own. In other embodiments, the ticket includes a portion of the key identifier, and the key manager identifiers or generates the desired key from the provided portion. Also, in some embodiment, the key-retrieval ticket does not include an authentication parameter (e.g., the controller signature or hypervisor identifier) and/or does not include an expiration parameter. Having all these parameters is beneficial, but not all of these parameters are employed in all embodiments.

Also, while the encryption/decryption processes were described above by reference to the host architecture 600 one of ordinary skill will realize that these processes could be implemented in a variety of different architectures that capture and encrypt/decrypt GVM messages at variety of different locations along their egress path out of the host. For instance, in some embodiments, the encryption/decryption processes are implemented in the PNIC of the host. In other words, the PNIC of the host in some embodiments examines the GVM messages to determine whether it should encrypt/decrypting them before sending them out of the host or sending them to their destination GVMs. In some embodiments, the PNIC performs other functions such as defining logical networks (e.g., through the user of technologies such as SRIOV).

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

A hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

Also, a number of the figures (e.g., FIGS. 4 and 5) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

Much of the discussion above relates to capturing and encrypting data messages sent from GVMs in a multi-VM hosted environment. However, one of ordinary skill will realize that the encryption architecture of some embodiments can be used to encrypt and decrypt data messages from any data end node (such as storage nodes, etc.). Accordingly, all of the above-described encryption architectures (such as the architectures of FIGS. 1, 6, and 7) and the above-described processes (e.g., of FIGS. 4 and 5) are equally applicable for encrypting and decrypting data messages from arbitrary data nodes in a virtualized environment. Also, the architecture of some embodiments can be used to provide other cryptographic services, such as signing messages for verification purposes, etc. In view of the foregoing, one of ordinary skill in the art would understand that the invention is not to be limited by the foregoing illustrative details, but rather is to be defined by the appended claims.

What is claimed is:

1. A method of providing encryption keys in a system comprising a plurality of host computers, the method comprising:
    at a key manager separate from the host computers:
        receiving, from a plurality of host computers, a plurality of key vouchers each (i) authenticating the host computer that provided the key voucher as an authorized key requestor and (ii) provided to the host computer by a set of one or more servers to authenticate the host computer to the key manager;
        using the key voucher of each host computer to authenticate the host computer as an authorized key requestor; and
        sending, to each host computer, an encryption key associated with the key voucher provided by the host computer, each host computer to use the sent key to encrypt data messages sent by a machine executing on the host computer.

2. The method of claim 1, wherein each key voucher from a host computer comprises an identifier for identifying the encryption key to send to the host computer.

3. The method of claim 1, wherein using the key voucher comprises verifying that a server that generated the key voucher was authorized to generate the key voucher.

4. The method of claim 3, wherein verifying that the server that generated the key voucher was authorized to generate the key voucher comprises using a certificate of the server received during a registration process.

5. The method of claim 1, wherein using the key voucher comprises verifying that an encryption key identified in the key voucher has not expired.

6. The method of claim 5, wherein the expiration of the identified encryption key is specified in a key policy for the identified encryption key, is based on the length of time the key has been in use, or is based on the amount of data the encryption key has been used to encrypt.

7. The method of claim 1, wherein:
each of the plurality of host computers execute a set of machines;
the set of servers comprise controllers for configuring processing of the data messages sent by the machines; and
the key manager is provided by a third party separate from administrators that manage the set of servers.

8. The method of claim 1, wherein the set of servers provides a set of encryption rules to each of the plurality of host computers to encrypt data messages sent by machines executing on the host computers.

9. The method of claim 8, wherein:
each encryption rule refers to a key policy; and
each key voucher is generated based on a key policy associated with a particular key identifier (KID) that identifies an encryption key for encrypting data messages according to the corresponding encryption rule.

10. The method of claim 8, wherein:
each encryption rule refers to a key policy; and
each key voucher is generated based on a key policy that specifies a key identifier to identify an encryption key to use for the encryption rule.

11. A method of configuring a system to provide encryption services in a system comprising a plurality of host computers, the method comprising:
receiving an encryption key policy from a set of one or more manager servers;
generating, for a plurality of encryptors executing on a plurality of host computers, a key voucher based on the received encryption key policy; and
sending the generated key voucher to the plurality of encryptors to use to retrieve, from a key manager external to the host computers, an encryption key identified by the key voucher for performing encryption operations on data messages sent and received by a set of machines executing on the plurality of host computers.

12. The method of claim 11 further comprising:
receiving an encryption rule from the set of manager computers; and
distributing the received encryption rule to a set of encryptors executing on a set of host computers, a particular encryptor using the encryption rule to determine that a data message sent from a machine executing on the encryptor's host computer requires encryption.

13. The method of claim 12, wherein the encryption rule refers to a key policy to identify an encryption key used to encrypt data messages that require encryption based on the encryption rule.

14. The method of claim 12, wherein determining that a data message requires encryption comprises determining that a data message should have an integrity check value appended.

15. The method of claim 11, wherein generating a key voucher comprises generating a set of key vouchers, each key voucher in the set of key vouchers comprising a unique pair of security parameter indices (SPIs) and key identifiers (KIDs).

16. The method of claim 11 wherein the key voucher includes at least one of a key identifier, a host identifier, an expiry for the key voucher, and a signature.

17. The method of claim 11, wherein each encryptor retrieves an encryption key by sending a request with a key voucher to the key manager.

18. A non-transitory machine readable medium storing a program which when executed by at least one processing unit configures a system to provide encryption services in a system comprising a plurality of host computers, the program comprising sets of instructions for:
receiving an encryption key policy from a set of one or more manager servers;
generating, for a plurality of encryptors executing on a plurality of host computers, a key voucher based on the received encryption key policy; and
sending the generated key voucher to the plurality of encryptors to use to retrieve, from a key manager external to the host computers, an encryption key identified by the key voucher for performing encryption operations on data messages sent and received by a set of machines executing on the plurality of host computers.

19. The non-transitory machine readable medium of claim 18, the program further comprises sets of instructions for:
receiving an encryption rule from the set of manager computers; and
distributing the received encryption rule to a set of encryptors executing on a set of host computers, a particular encryptor using the encryption rule to determine that a data message sent from a machine executing on the encryptor's host computer requires encryption.

20. The non-transitory machine readable medium of claim 19, wherein the encryption rule refers to a key policy to identify an encryption key used to encrypt data messages that require encryption based on the encryption rule.

* * * * *